US012176641B2

(12) United States Patent
Gondo

(10) Patent No.: US 12,176,641 B2
(45) Date of Patent: Dec. 24, 2024

(54) CONNECTOR

(71) Applicant: Molex, LLC, Lisle, IL (US)

(72) Inventor: Daishi Gondo, Yamato (JP)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 18/387,070

(22) Filed: Nov. 6, 2023

(65) Prior Publication Data

US 2024/0072466 A1 Feb. 29, 2024

Related U.S. Application Data

(63) Continuation of application No. 18/307,040, filed on Apr. 26, 2023, now Pat. No. 11,978,973, which is a (Continued)

(30) Foreign Application Priority Data

Jun. 18, 2019 (JP) ................................. 2019-112659

(51) Int. Cl.
*H01R 12/71* (2011.01)
*H01R 12/57* (2011.01)
(Continued)

(52) U.S. Cl.
CPC ........... *H01R 12/716* (2013.01); *H01R 12/57* (2013.01); *H01R 12/707* (2013.01);
(Continued)

(58) Field of Classification Search
CPC .... H01R 12/716; H01R 12/57; H01R 12/707; H01R 13/447; H01R 13/504;
(Continued)

(56) References Cited

U.S. PATENT DOCUMENTS 2,433,358 A 12/1947 Garberding
5,915,975 A * 6/1999 McGrath .............. H01R 12/716 439/74

(Continued)

FOREIGN PATENT DOCUMENTS

CN 101436739 A 5/2009
CN 102292874 A 12/2011

(Continued)

OTHER PUBLICATIONS

Non-Final office action received for U.S. Appl. No. 17/603,583, mailed on Mar. 13, 2024, 10 pages.

(Continued)

*Primary Examiner* — Abdullah A Riyami
*Assistant Examiner* — Nelson R. Burgos-Guntin

(57) ABSTRACT

A connector is provided with a half body part, each of which including a connector main body and a plurality of terminals arranged at a predetermined pitch and integrated with the connector main body by insert molding, a main body end part formed at both ends of the connector main body by coupling the connector main bodies of the half body parts arranged in parallel, and a reinforcing metal fitting integrated with the main body end part.

6 Claims, 11 Drawing Sheets

Related U.S. Application Data continuation of application No. 17/382,436, filed on Jul. 22, 2021, now Pat. No. 11,721,921, which is a continuation of application No. 16/836,921, filed on Apr. 1, 2020, now Pat. No. 11,095,059.

(60) Provisional application No. 62/838,345, filed on Apr. 25, 2019.

(51) Int. Cl.

| | |
|---|---|
| ***H01R 12/70*** | (2011.01) |
| ***H01R 13/447*** | (2006.01) |
| ***H01R 13/504*** | (2006.01) |
| ***H01R 13/627*** | (2006.01) |
| ***H01R 13/631*** | (2006.01) |
| ***H01R 13/639*** | (2006.01) |

(52) U.S. Cl.

CPC ......... *H01R 13/447* (2013.01); *H01R 13/504* (2013.01); *H01R 13/6275* (2013.01); *H01R 13/631* (2013.01); *H01R 13/6395* (2013.01)

(58) Field of Classification Search

CPC .............. H01R 13/6275; H01R 13/631; H01R 13/6395; H01R 13/502; H01R 13/627; H01R 24/00; H01R 12/7088; H01R 12/73; H01R 13/20; H01R 12/71; H01R 13/405; H01R 12/732

See application file for complete search history.

(56) References Cited

U.S. PATENT DOCUMENTS

| | | | | |
|---|---|---|---|---|
| 6,503,101 | B1 | 1/2003 | Yu | |
| 8,888,506 | B2 | 11/2014 | Nishimura et al. | |
| 8,986,027 | B2 | 3/2015 | Nishimura et al. | |
| 9,196,982 | B2 * | 11/2015 | Sasaki | H01R 12/73 |
| 10,784,616 | B2 | 9/2020 | Gondo | |
| D918,843 | S | 5/2021 | Furukawa | |
| D922,958 | S | 6/2021 | Yokoyama | |
| 11,095,059 | B2 | 8/2021 | Gondo | |
| D960,107 | S | 8/2022 | Williams Barnett | |
| D967,776 | S | 10/2022 | Kobuchi | |
| D971,152 | S | 11/2022 | Horino | |
| 11,658,431 | B2 | 5/2023 | Gondo | |
| 11,764,510 | B2 | 9/2023 | Tanaka | |
| 2005/0032400 | A1 | 2/2005 | Zhang et al. | |
| 2005/0042924 | A1 | 2/2005 | Zhang et al. | |
| 2006/0063432 | A1 | 3/2006 | Chen | |
| 2006/0276061 | A1 | 12/2006 | Koguchi et al. | |
| 2008/0176429 | A1 * | 7/2008 | Zhang | H01R 12/00 439/95 |
| 2008/0207014 | A1 | 8/2008 | Takeuchi et al. | |
| 2008/0261462 | A1 * | 10/2008 | Mizumura | H01R 12/00 439/876 |
| 2008/0305657 | A1 | 12/2008 | Midorikawa | |
| 2009/0061655 | A1 | 3/2009 | Miyazaki et al. | |
| 2010/0068900 | A1 | 3/2010 | Wu et al. | |
| 2011/0263140 | A1 | 10/2011 | Sato et al. | |
| 2013/0012039 | A1 | 1/2013 | Nose et al. | |
| 2013/0137308 | A1 * | 5/2013 | Chiang | H01R 12/716 439/660 |
| 2013/0330943 | A1 * | 12/2013 | Sasaki | H01R 12/716 439/74 |
| 2013/0337681 | A1 * | 12/2013 | Little | H01R 12/716 439/569 |
| 2015/0079816 | A1 | 3/2015 | Suzuki | |
| 2015/0140840 | A1 | 5/2015 | Nishimura et al. | |
| 2015/0140841 | A1 | 5/2015 | Watanabe | |
| 2015/0207248 | A1 | 7/2015 | Takenaga et al. | |
| 2015/0263464 | A1 * | 9/2015 | Arichika | H01R 12/7029 439/374 |
| 2016/0036145 | A1 | 2/2016 | Hasegawa | |
| 2016/0073486 | A1 | 3/2016 | Teramoto | |
| 2016/0190719 | A1 | 6/2016 | Brzezinski et al. | |
| 2016/0315430 | A1 * | 10/2016 | Takeuchi | H01R 12/707 |
| 2017/0098900 | A1 | 4/2017 | Kobuchi | |
| 2020/0044374 | A1 | 2/2020 | Ishida | |
| 2020/0127400 | A1 | 4/2020 | Sasayama et al. | |
| 2020/0343660 | A1 | 10/2020 | Gondo | |
| 2022/0247104 | A1 | 8/2022 | Miyahara | |
| 2023/0261401 | A1 | 8/2023 | Yayoshi | |
| 2023/0291153 | A1 | 9/2023 | Ebisawa | |

FOREIGN PATENT DOCUMENTS

| | | | |
|---|---|---|---|
| CN | 202103222 | U | 1/2012 |
| CN | 103168395 | A | 6/2013 |
| CN | 205178062 | U | 4/2016 |
| CN | 106067623 | A | 11/2016 |
| CN | 109038013 | A | 12/2018 |
| JP | H10125420 | A | 5/1998 |
| JP | 2001126789 | A | 5/2001 |
| JP | 3368471 | B2 | 1/2003 |
| JP | 2005100903 | A | 4/2005 |
| JP | 2005510850 | A | 4/2005 |
| JP | 2014056762 | A | 3/2014 |
| JP | 2014075295 | A | 4/2014 |
| JP | 2016096079 | A | 5/2016 |
| JP | 2017111931 | A | 6/2017 |
| JP | 6174005 | B2 | 8/2017 |
| JP | 2018081569 | A | 5/2018 |
| JP | 2018081869 | A | 5/2018 |
| JP | 2019003918 | A | 1/2019 |
| JP | 7403614 | B2 | 12/2023 |
| KR | 20130129111 | A | 11/2013 |
| KR | 20140044738 | A | 4/2014 |
| KR | 20150110313 | A | 10/2015 |
| KR | 20180072533 | A | 6/2018 |
| KR | 20180123980 | A | 11/2018 |
| TW | D195136 | S | 1/2019 |
| WO | 2019021611 | A1 | 1/2019 |

OTHER PUBLICATIONS

Ex Parte Quayle Action received for U.S. Appl. No. 29/745,812, mailed on Jan. 17, 2023, 6 pages.

Intenational Search Report and Written Opinion received for PCT Application No. PCT/JP2020/017438, mailed on Jun. 30, 2020, 15 pages. (6 pages of English translation and 9 pages of official copy).

International Preliminary Report on Patentability received for PCT Application No. PCT/JP2020/017438, mailed on Nov. 4, 2021, 11 pages. (7 pages of English translation and 5 pages of official copy).

* cited by examiner

Prior art

CONNECTOR

RELATED APPLICATION

This application is a continuation of U.S. application Ser. No. 18/307,040 filed on Apr. 26, 2023, which is a continuation of U.S. patent application Ser. No. 17/382,436 filed on Jul. 22, 2021, now U.S. Pat. No. 11,721,921, which is a continuation of U.S. application Ser. No. 16/836,921, filed on Apr. 1, 2020, now U.S. Pat. No. 11,095,059, which claims priority to Japanese Application Serial No. 2019-112659, filed on Jun. 18, 2019 and U.S. Provisional Application No. 62/838,345 filed on Apr. 25, 2019, each of which are incorporated herein by reference in their entirety.

TECHNICAL FIELD

The present disclosure relates to a connector.

BACKGROUND

Conventionally, connectors such as board-to-board connectors have been used to electrically connect pairs of parallel circuit boards to each other. These types of connectors are attached to both opposing surfaces of a pair of circuit boards and fitted together to ensure electric conduction (for example, see Patent Reference 1).

FIG. 11 is a perspective view illustrating a conventional connector.

In the drawing, 811 is a connector housing mounted on a circuit board (not illustrated), which has a pair of protruding parts 812 extending in the longitudinal direction thereof. Furthermore, a plurality of terminals 861 are mounted to the protruding parts 812 side by side in the longitudinal direction of the connector.

Moreover, when the connector is mated with a mating connector (not illustrated), the protruding parts 812 are inserted into each of the pair of recessed grooves formed in the mating housing of the mating connector. This process allows the respective terminals 861 to contact mating terminals (not illustrated) mounted side by side in the recessed groove and to establish electrical conduction.

Prior Art Documents: PATENT DOCUMENTS: Patent Document 1 JP 2001-126789 A

SUMMARY

However, in conventional connectors, the terminals 861 are integrated with the housing 811, making the connector more compact and reducing the spacing between the protruding parts 812, thereby reducing the pitch between the terminals 861. Consequently, production of the connector is made more difficult. The terminals 861 are usually formed so as to be integrated with the pair of protruding parts 812 of the housing 811 using a method of molding referred to as overmolding or insert molding. Using this method leads to narrower spacing between the protruding parts 812 and narrower pitch between the terminals 861, making it difficult to precisely deploy a large number of terminals 861 in a mold for molding the housing 811 corresponding to the pair of protruding parts 812.

In order to overcome the above issues in conventional connectors, an object herein is to provide a compact and reliable connector that can be easily produced, while achieving narrower spacing between the protruding parts having a plurality of terminals mounted.

Therefore, a connector is provided with: half body parts, each including a connector main body and a plurality of terminals arranged at a predetermined pitch and integrated with the connector main body by insert molding; a main body end part formed at both ends of the connector main body by coupling the connector main bodies of the half body parts arranged in parallel; and a reinforcing metal fitting integrated with the main body end part, wherein each of the terminals has a tail part extending outward in a width direction of the connector main body, adjacent terminals of the plurality of terminals held by each connector main body are facing in the opposite direction with respect to the width direction of the connector main body, the pitch of a tail part extending towards each side in the width direction of each connector main body is twice the pitch of the terminals held by each connector main body, and a tail part extending from the connector main body of one half body part towards the connector main body of an adjacent half body part is shifted only by a half-pitch with respect to a tail part extending from the connector main body of the adjacent half body part towards the connector main body of the one half body part.

Another connector is further provided with, a through hole opened in an upper surface and a lower surface of the connector, wherein a tail part extending from a connector main body of one half body part towards a connector main body of an adjacent half body part and a tail part extending from the connector main body of the adjacent half body part towards the connector main body of the one half body part are visible through the through hole when viewed from a mating direction.

Yet another connector is provided with a through hole opened in an upper surface and a lower surface of the connector, wherein a tail part extending from a connector main body of one half body part towards a connector main body of an adjacent half body part and a tail part extending from the connector main body of the adjacent half body part towards the connector main body of the one half body part are positioned in the through hole.

In yet another connector, an end portion of a tail part extending from a connector main body of one half body part towards a connector main body of an adjacent half body part and an end portion of a tail part extending from the connector main body of the adjacent half body part towards the connector main body of the one half body part are positioned further towards an outer side in a width direction than a center in the width direction of the connector.

Furthermore, in yet another connector, the reinforcing metal fitting includes an upper plate extending in the width direction of the connector main body, a pair of left and right leg parts connected to both left and right side edges of the upper plate and extending downward, and an end wall outer cover part and an end wall inner cover part connected to front and rear side edges of the upper plate and extending downward.

A connector pair includes a connector according to the present disclosure and a mating connector that mates with the connector.

According to the present disclosure, a connector is provided that is compact and reliable and can easily be produced, while achieving narrower spacing between the protruding parts having a plurality of terminals mounted thereon.

BRIEF DESCRIPTION OF THE DRAWINGS

FIGS. 5A and 5B provide a two-view drawing illustrating a first process to produce a first protruding end part of the first connector according to the present embodiment, wherein FIG. 5A is a top view, while FIG. 5B is a bottom view.

FIGS. 6A and 6B provide a two-view drawing illustrating a second process to produce a first protruding end part of the first connector according to the present embodiment, wherein FIG. 6A is a top view, while FIG. 6B is a bottom view.

FIGS. 7A and 7B provide enlarged views illustrating the essential parts of the first and second processes to produce the first protruding end part of the first connector according to the present embodiment, wherein FIG. 7A is an enlarged view of part E of FIG. 5B, while FIG. 7B is an enlarged view of part F of FIG. 6B.

FIGS. 8A-8D are cross section views illustrating the first and second processes to produce the first protruding end part of the first connector according to the present embodiment, wherein FIG. 8A is a cross section view taken along the line A-A of FIG. 5A, FIG. 8B is a cross section view taken along the line B-B of FIG. 5A, FIG. 8C is a cross section view taken along the line C-C of FIG. 6A, and FIG. 8D is a cross section view taken along the line D-D of FIG. 6A.

DETAILED DESCRIPTION

Embodiments will hereinafter be described in detail with reference to the drawings.

Figure 1:
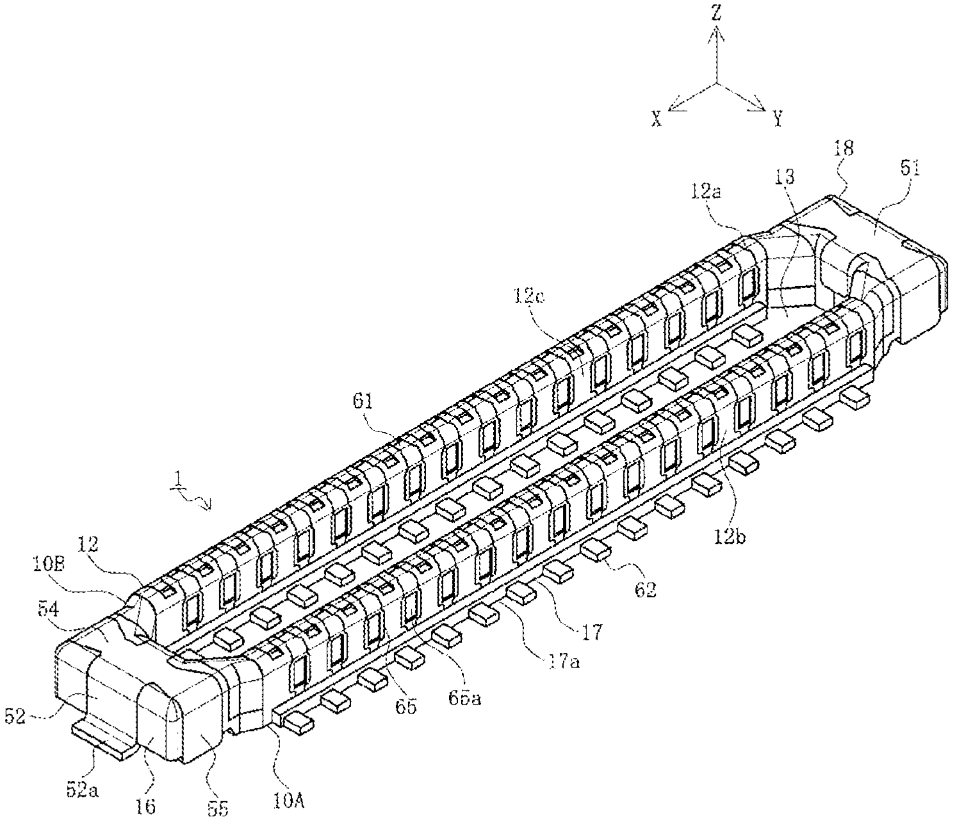
FIG. 1 is a perspective view of a first connector according to the present embodiment.
Figure 2:
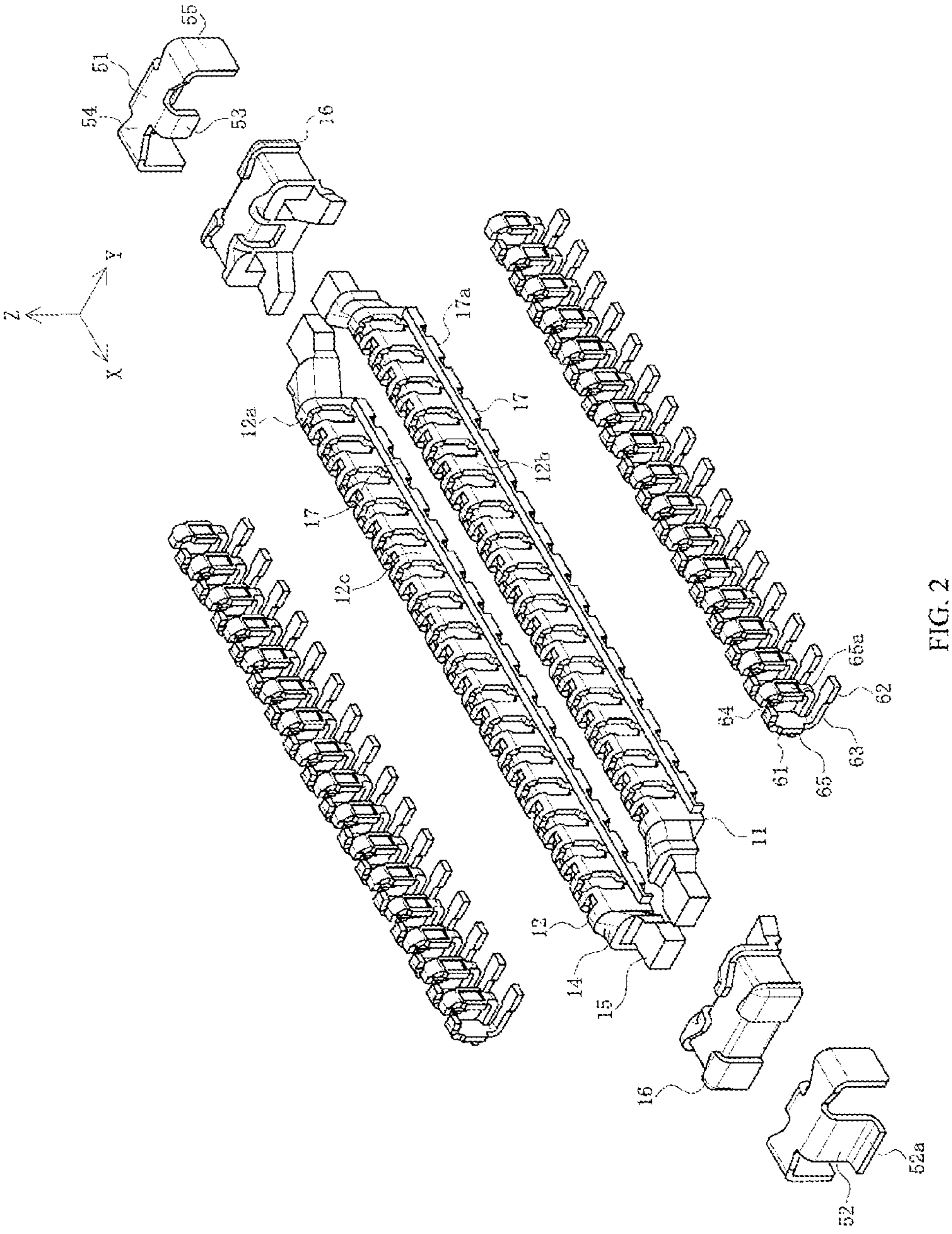
FIG. 2 is an exploded view of the first connector according to the present embodiment.
Figure 3:
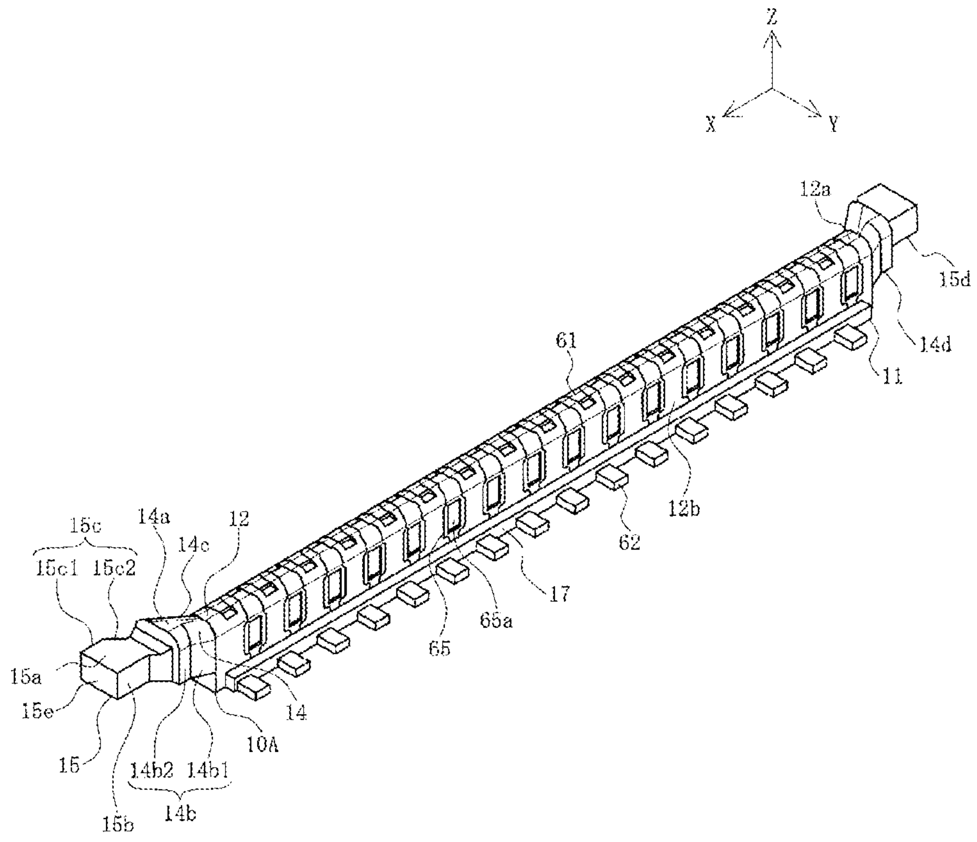
FIG. 3 is a perspective view of a left half body part of the first connector according to the present embodiment.

FIG. 1 is a perspective view of the first connector according to the present embodiment, FIG. 2 is an exploded view of the first connector according to the present Embodiment, and FIG. 3 is a perspective view of the left half body part of the first connector according to the present embodiment.

In the diagrams, 1 is a first connector as one of a pair of board-to-board connectors that are connectors of the present embodiment. The first connector 1 is a surface mounting type connector mounted on the surface of a first board (not illustrated) serving as a mounting member and is mated to a second connector 101 (described below) that serves as a mating connector. Furthermore, the second connector 101 is the other of the pair of board-to-board connectors and is a surface mount type connector mounted on the surface of a second board (not depicted) serving as a mounting member.

The first connector 1 and the second connector 101 according to the present embodiment are preferably used to electrically connect the first board to the second board, but can also be used to electrically connect other members. For example, the first board and the second board are each a printed circuit board, a flexible flat cable (FFC), a flexible circuit board (FPC), or the like as used in electronic devices or the like, but may be any type of board.

In addition, in the present embodiment, expressions indicating direction such as top, bottom, left, right, front, rear, and the like used to describe the configuration and operation of each part of the first connector 1 and the second connector 101 are relative rather than absolute and are appropriate when each part of the first connector 1 and the second connector 101 are in the positions depicted in the drawings; that said, these directions should be interpreted as changing in accordance with the change in position when the position thereof is changed.

Furthermore, the first connector 1 is composed of a pair of right and left half body parts, or a left half body part 10A and a right half body part 10B, joined by a first reinforcement fitting 51 as a reinforcement fitting and a cover part 16 integrally molded by a method of molding called overmolding, outset molding, or insert molding (hereinafter, referred to as "insert molding"). Note that as the left half body part 10A and the right half body part 10B are the same members arranged so as to face each other on the left and right sides, they will be described as half body part 10 when comprehensively described. The left half body part 10A and the right half body part 10B are each substantially gate shaped (a shape projected on the X-Y plane) in a plan view, with the space between the left half body part 10A and the right half body part 10B that are joined together being a long and narrow recessed groove part 13 extending in the longitudinal direction (X-axis direction) of the first connector 1. The recessed groove part 13 is a through hole that is open on the upper face and the lower face of the first connector 1.

Note that in the present embodiment, for convenience of description, the first connector 1 is described as having a pair of half body parts 10, that is, a configuration in which two of the half body parts 10 are arranged in parallel; however, three or more of the half body parts 10 may be arranged in parallel. Furthermore, the half body part 10 does not necessarily need to be substantially gate shaped and may have any shape provided that both ends in the longitudinal direction can be joined by the first reinforcement fitting 51 and the cover part 16.

The half body part 10 has a first housing 11 as a connector body which is integrally formed by an insulating material such as a synthetic resin and a shape which is substantially gate shaped in a plan view. Each first housing 11 includes a narrow long band shaped bottom plate part 17 stretching in the longitudinal direction (X-axis direction) of the first housing 11 and a first protruding part 12 as a narrow long protruding part stretching in the longitudinal direction of the first housing 11 integrally formed on the upper surface of the bottom plate 17. The first protruding part 12 is a member having a cross section shaped similar to an upside-down U and has a curved mating surface 12*a* positioned on the top (Z-axis positive direction) along with both an outer surface 12*b* and an inner surface 12*c* that are connected to both the right and left sides of the mating surface 12*a*. The outer surface 12*b* and the inner surface 12*c* are a pair of flat surfaces that face each other in parallel and extend in the longitudinal direction of the first housing 11. Note that the dimension in the width direction (Y-axis direction) of the first protruding part 12 is shorter than the dimension in the width direction of the bottom plate part 17, such that the bottom plate part 17 protrudes outward in the width direction from the outer surface 12*b* and the inner surface 12*c* at the lower end (the end in the Z-axis negative direction) of the first protruding part 12. Furthermore, the bottom surface of the bottom plate part 17 is a mounting surface 17*a* of the first housing 11 that faces the surface of the first board.

In addition, a first terminal 61 as a terminal is disposed on each first protruding part 12. The first terminals 61 are arranged at a prescribed pitch with a plurality of pieces (32 pieces in the example shown in the drawing) on each part. The first terminal 61 is a member integrally formed by punching, bending, or the like on a conductive metal plate, and includes: a main body part 63 extending in the width direction of the first protruding part 12; a tail part 62 connected to a first end of the main body part 63; a contact part 65 connected to a second end of the main body part 63 at an angle of approximately 90 degrees and extending in the height direction; and an upper end part 64 connected to the upper end of the contact part 65 at an angle of approximately 90 degrees.

The main body part 63 is a part embedded and held in the bottom plate part 17. Furthermore, the tail part 62 extends outward in the width direction from the bottom plate part 17 and is connected by soldering or the like to a connection pad connected to a conductive trace of the first board. The conductive trace is typically a signal line. Furthermore, the contact part 65 includes a contact recessed part 65*a* that is a portion contacting the second terminals 161 (described below) of the second connector 101 when the first connector 1 and the second connector 101 are mated, and preferably, is a portion depressed from the surface.

The first terminal 61 is integrated with the first housing 11 through insert molding. In other words, the first housing 11 is molded by setting the first terminals 61 inside and then filling in the cavity of the metal mold with an insulating material. As a result, the first terminals 61 are integrally mounted to the first housing 11, with the lower surfaces of the main body part 63 and the tail part 62 exposed to the mounting surface 17*a* of the bottom plate part 17, and with the surfaces of the contact part 65 and the upper end part 64 exposed to the outer surface 12*b* or the inner surface 12*c* of the first protruding part 12 and to the mating surface 12*a*.

Furthermore, the first terminal 61 mounted on each first protruding part 12 is oriented such that adjacent objects face opposite in the width direction of the first protruding part 12. In the example illustrated in the diagram, among the first terminals 61 mounted to the first protruding part 12 of the left half body part 10A, the first terminal 61 positioned at the front end (the end in the X-axis positive direction) is oriented such that the tail part 62 protrudes outward (in the Y-axis positive direction), while the first terminal 61 positioned second from the front end is oriented such that the tail part 62 protrudes inward (in the Y-axis negative direction). In this manner, as the first terminals 61 are mounted on the first protruding part 12 arranged in a line in mutually opposing directions, the pitch of the tail parts 62 protruding from both sides of the first protruding part 12 is twice that of the pitch of the first terminal 61. This configuration facilitates the operation of connecting the first terminal to the connection pad of the first board by soldering or the like. The pitch of the contact part 65 exposed on the outer surface 12*b* of the first protruding part 12 and the pitch of the contact part 65 exposed on the inner surface 12*c* are also twice the pitch of the first terminal 61.

Note that as the first terminal 61 is a member that will be integrated into the first housing 11 using insert molding or the like, the terminals are not meant to exist separated from the first housing 11; however, note that the terminals are illustrated separately from the first housing 11 in FIG. 2 for convenience of explanation.

Moreover, the first protruding end parts 18, which are main body end parts and function as mating guide parts, are disposed on both ends in the longitudinal direction of the first protruding part 12. The first protruding end parts 18 are members connected to both ends in the longitudinal direction of each first protruding part 12 and are formed so as to join the left half body part 10A and the right half body part 10B. Moreover, in a state in which the first connector 1 and the second connector 101 are mated, the first protruding end part 18 functions as an insertion protruding part that is inserted into a mating recessed part 122 (described below) of the second protruding end part 121 of the second connector 101.

The first protruding end part 18 consists of an extension end part 14 of the left and right half body parts 10, an embedded part 15, as well as a cover part 16 and a first reinforcement fitting 51.

The extension end parts 14 extending in the longitudinal direction are respectively integrally connected to both ends in the longitudinal direction of the first protruding part 12 of the half body part 10, while the embedded parts 15 further extending in the longitudinal direction of the first protruding part 12 are respectively integrally connected to each extension end part 14. Note that the extension end parts 14 extend inclined obliquely inward, while the embedded parts 15 extend in the longitudinal direction from an inwardly-eccentric position at the tip of the extension end parts 14 and are positioned inward from the outer surface 12*b* of the first protruding part 12. In other words, the extension end part 14 of the left half body part 10A extends obliquely in the right direction (Y-axis negative direction), while the embedded part 15 extends longitudinally from a position eccentric in the right direction at the tip of the extension end part 14. In addition, the extension end part 14 of the right half body part 10B extends obliquely in the left direction (Y-axis positive direction), while the embedded part 15 extends longitudinally from a position eccentric in the left direction at the tip of the extension end part 14.

Furthermore, at least part of the extension end part 14 of the left and right half body parts 10 and the entire embedded part 15 are covered by a cover part 16 formed from an insulating material such as a synthetic resin or the like. Specifically, the cover part 16 is formed by performing insert molding with the embedded parts 15 of the right and left half body parts 10 arranged adjacent to one another and covered by the first reinforcement fitting 51. As a result, the extension end part 14 and the embedded part 15 of the left and right half body parts 10, along with the first protruding end part 18, in which the cover part 16 and the first reinforcement fitting 51 are integrated, are formed and the left and right half body parts 10 are joined. The cover part 16 does not necessarily cover the entire embedded part 15, but may cover the embedded part 15 to a degree sufficient to join the right and left half body parts 10. However, the entire embedded part 15 is preferably covered to increase the binding strength to the highest degree. The cover part 16 is a member formed so as to be integrated with other members by insert molding and is not an independent member separate from other members. It should, however, be noted that, for convenience of illustration, the cover part 16 in FIG. 2 is depicted as if it were an independent member.

As illustrated in FIG. 3, the extension end part 14 has an upper surface 14*a* located on the top, an outer surface 14*b* and an inner surface 14*c* connected to the right and left ends of the upper surface 14*a*, and a lower surface 14*d* located on the bottom. The lower surface 14*d* is located above the mounting surface 17*a* and is at least partially covered by the cover part 16. The upper surface 14*a* is substantially flush with the mating surface 12*a* of the first protruding part 12. The inner surface 14*c* is a surface inwardly inclined relative to the inner surface 12*c* of the first protruding part 12. The outer surface 14*b* includes an inclined outer surface 14*b*1 inwardly inclined relative to the outer surface 12*b* of the first protruding part 12 and a parallel outer surface 14*b*2 substantially parallel with the outer surface 12*b* of the first protruding part 12. The parallel outer surface 14*b*2 is substantially flush with the outer surface of the cover part 16 and constitutes a part of the outer surface of the first protruding end part 18.

In addition, the embedded part 15 is a member provided with a substantially rectangular parallelepiped shape overall, having an upper surface 15*a* located on the top, an outer surface 15*b* and an inside surface 15*c* on both the left and right sides, a lower surface 15*d* located on the bottom, and an end surface 15*e* on both ends in the longitudinal direction of the first connector 1. The upper surface 15*a* and the lower surface 15*d* are flat surfaces parallel with each other. The distance between the upper surface 15*a* and the lower surface 15*d*, that is, the thickness of the embedded part 15, is less than the thickness of the extension end part 14 and the thickness of the first protruding part 12. The upper surface 15*a* is located below the mating surface 12*a*, while the lower surface 15*d* is located above the mounting surface 17*a*. The outer surface 15*b* is a flat surface substantially parallel with the outer surface 12*b* of the first protruding part 12 and is positioned inside relative to the outer surface 12*b*, in other words, closer to the middle in the width direction of the first housing 11. The inner surface 15*c* includes a parallel inner surface 15*c*1 that is a flat surface substantially parallel with the inner surface 12*c* of the first protruding part 12 and an inclined inner surface 15*c*2 substantially parallel with the inner surface 14*c* of the extension end part 14. The end surface 15*e* is a flat surface perpendicular to the first connector 1 in the longitudinal direction. The embedded part 15 is completely covered by the cover part 16, or in other words, is embedded in the cover part 16.

In this manner, as the extension end part 14 extends inwardly at an oblique incline and the embedded part 15 is positioned inwardly from the outer surface 12*b* of the first protruding part 12, the width (dimension in the Y-axis direction) of the first protruding end part 18 can be made smaller than the width (distance between the outer surface 12*b* of the left and right first protruding parts 12) of the first connector 1. Note that in the event the width of the first protruding end part 18 does not need to be smaller than the width of the first connector 1, the extension end part 14 does not necessarily have to be inclined obliquely inward, but rather can be extended directly. Furthermore, the extension end part 14 can be omitted by extending the embedded part 15 directly from both ends in the longitudinal direction of the first protruding part 12. In this case, the longitudinal dimension of the first connector 1 can be shortened. Furthermore, when three or more half body parts 10 are arranged in parallel, the extension end part 14 can be extended so as to have a Y-shape from both ends in the longitudinal direction of the first protruding part 12.

The first reinforcement fitting 51 is a member integrally formed by punching, bending, or the like of a metal plate, and includes a substantially rectangular top plate 54 that extends in the width direction of the first housing 11, and a substantially rectangular leg part 55 connected to both the left and right edges of the top plate 54 and that extends downwardly, is connected to both the front and rear edges of the top plate 54, and includes the end wall outer cover part 52 and end wall inner cover part 53 that extend downwardly. Note that a tail part 52*a* is connected to the lower end of the end wall outer cover part 52. The width of the end wall outer surface cover part 52 is larger than the width of the end wall inner surface cover part 53.

As described above, the first reinforcement fitting 51 is integrated with the cover part 16 so as to configure the first protruding end part 18. The top plate 54 is embedded in the upper surface of the first protruding end part 18. In this state, the upper surface of the top plate 54 is flush with the upper surface of the cover part 16 and constitutes over half the area of the upper surface of the first protruding end part 18. The right and left leg parts 55 are embedded in the right and left outer surfaces of the first protruding end part 18. The outer surface of the leg part 55 is flush with the outer surface of the cover part 16 and constitutes over half the area of the outer surface of the first protruding end part 18. Furthermore, the end wall outer surface cover part 52 and the end wall inner surface cover part 53 are embedded in the end wall outer surface and the end wall inner surface of the first protruding end parts 18. The respective outer surfaces of the end wall outer surface cover part 52 and the end wall inner surface cover part 53 are flush with the end wall outer surface and the end wall inner surface of the cover part 16 and constitute over half of the end wall outer surface and over half the area of the end wall inner surface of the first protruding end part 18.

The tail part 52*a* is connected to the lower end of the end wall outer surface cover part 52 at an angle of approximately 90 degrees, extends outward in the longitudinal direction of the first housing 11 and is connected by soldering or the like to a connection pad connected to a conductive trace of the first board. Note that the conductive trace is typically a power line. As required, the lower end of the leg part 55 can be provided close to or in contact with the surface of the first board. In this case, the lower end of the leg part 55 is connected by soldering or the like to a connection pad of the first board, thereby increasing the strength of connection between the first reinforcement fitting 51 and the first board.

A method to produce the first connector 1 configured as above will now be described.

Figure 4:
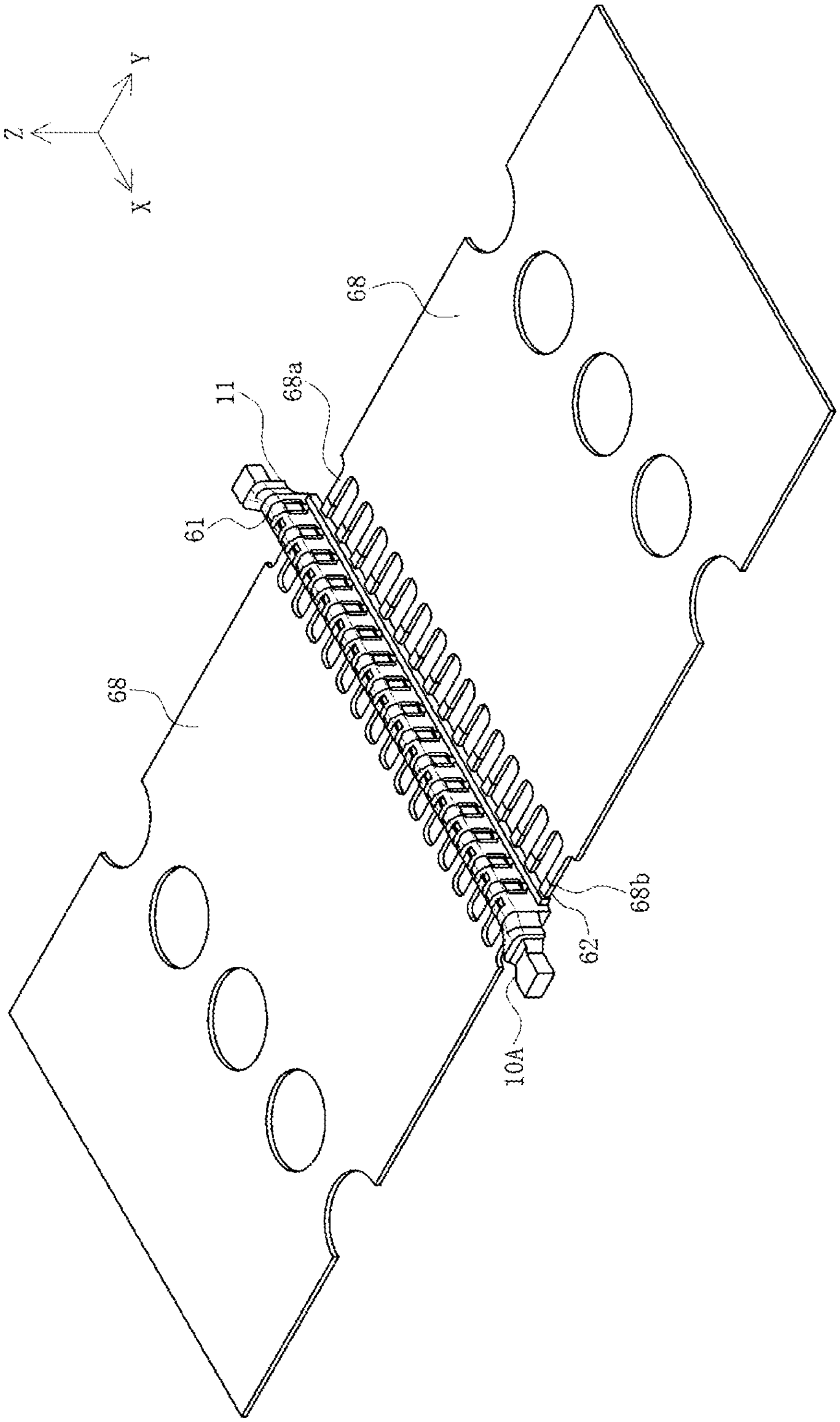
FIG. 4 is a perspective view illustrating a process 1 to produce the left half body part of the first connector according to the present embodiment.
Figure 5A:
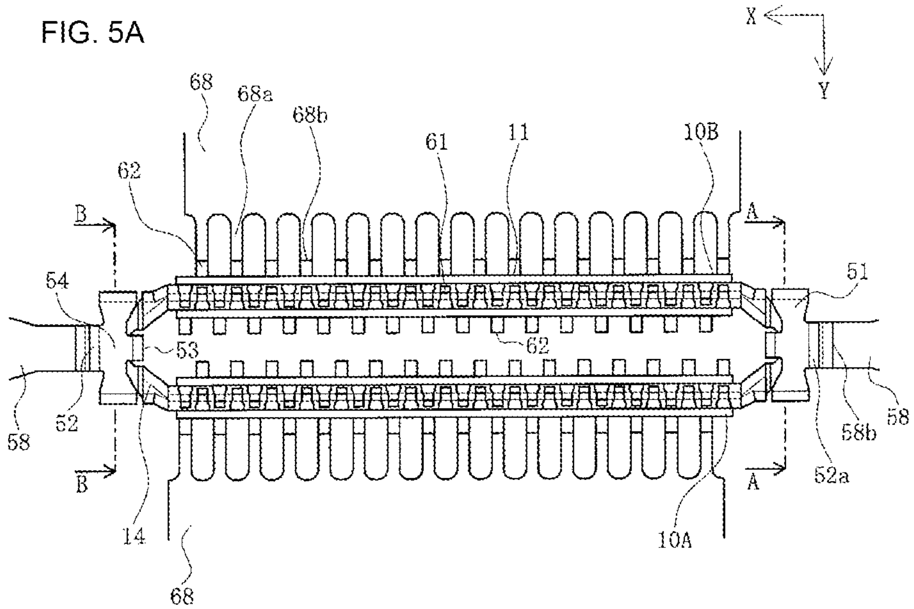
Figure 5B:
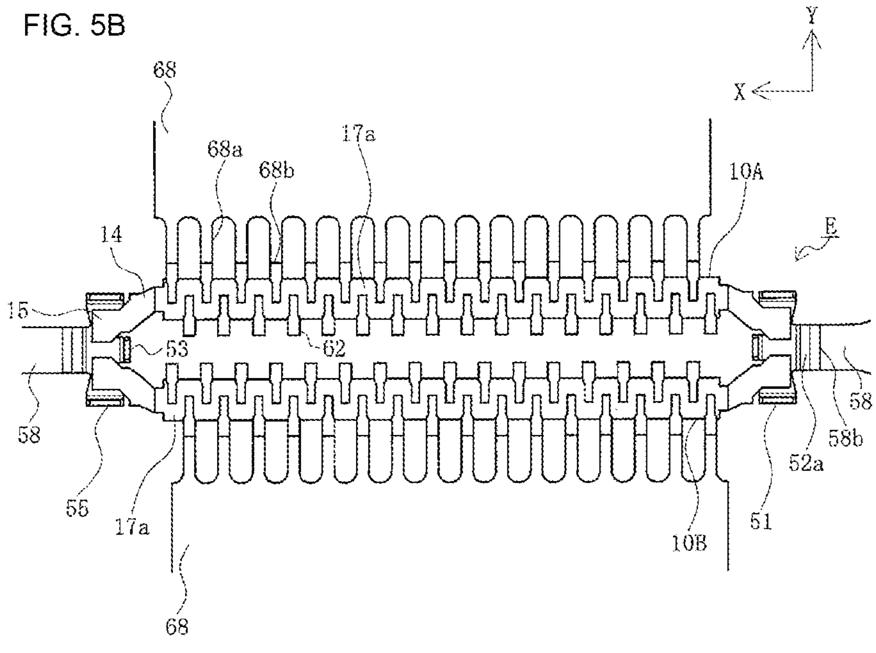
Figure 6A:
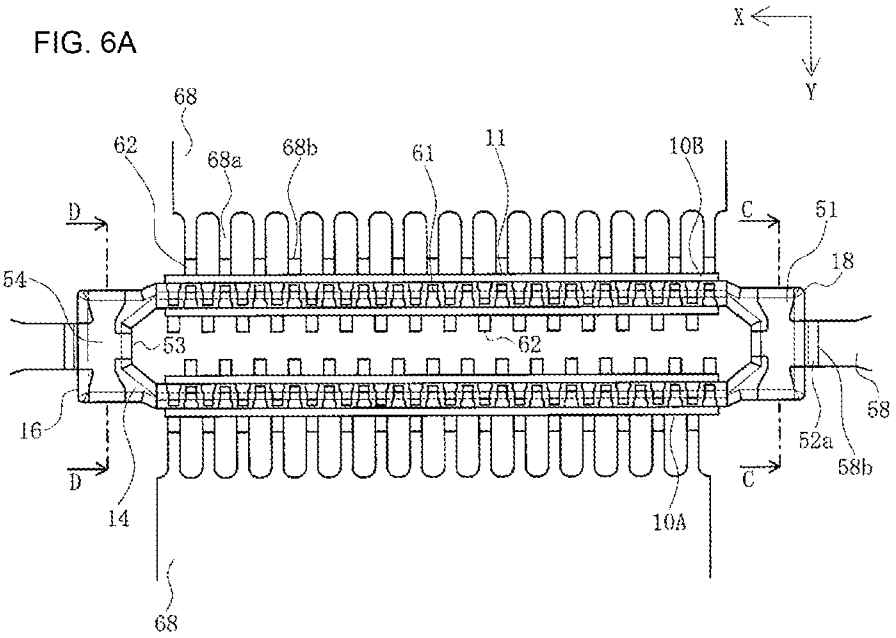
Figure 6B:
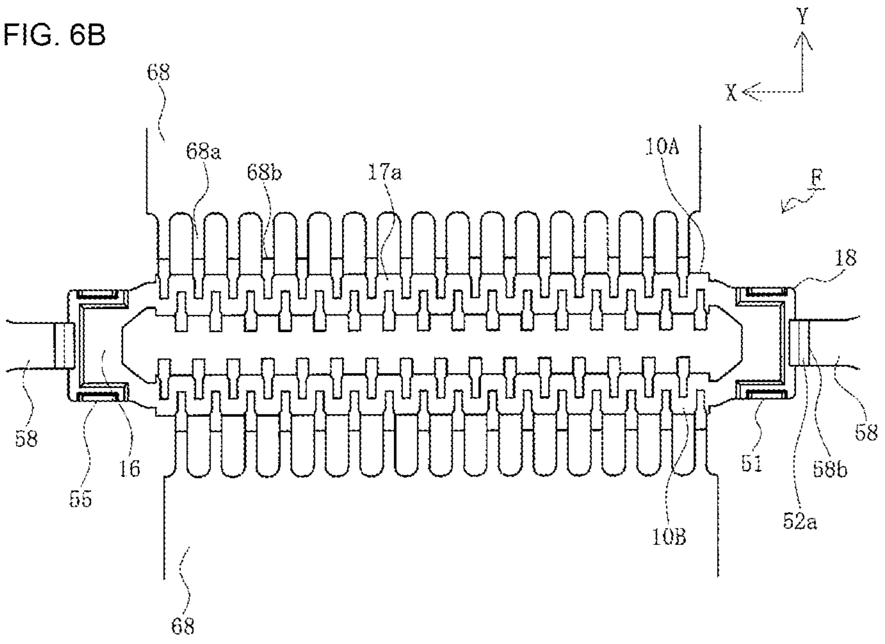
Figure 7A:
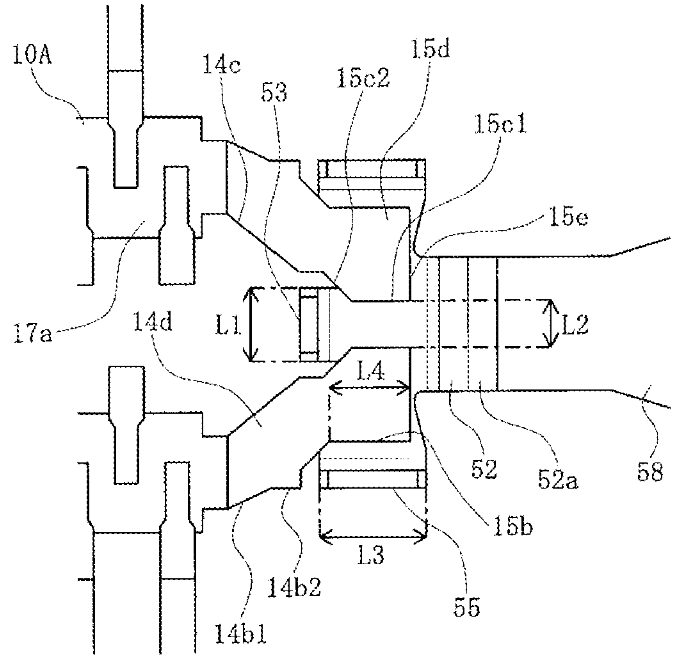
Figure 7B:
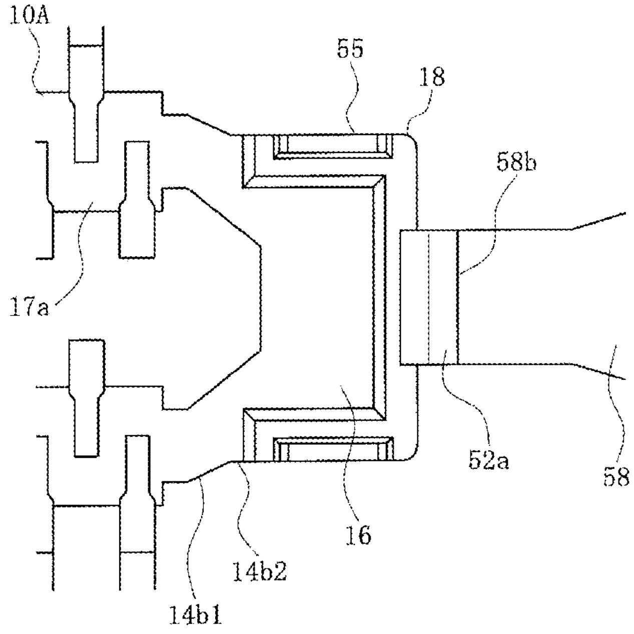
Figure 8A:
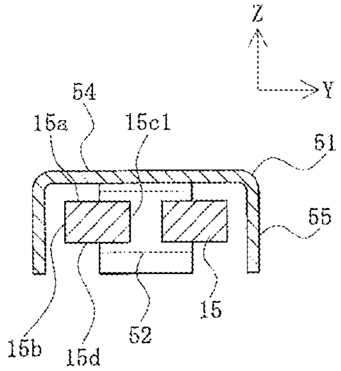
Figure 8B:
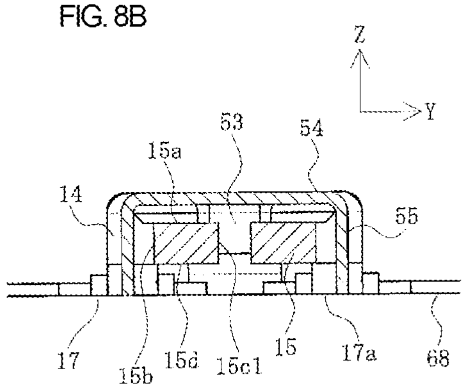
Figure 8C:
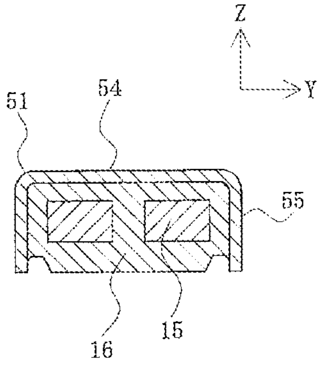
Figure 8D:
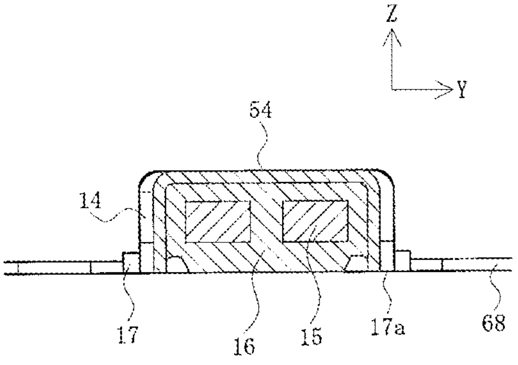

FIG. 4 is a perspective view illustrating a process 1 to produce the left half body part of the first connector according to the present embodiment. FIGS. 5A and 5B provide a two-view drawing illustrating a first process to produce a first protruding end part of the first connector according to the present embodiment. FIGS. 6A and 6B provide a two-view drawing illustrating a second process to produce the first protruding end part of the first connector according to the present embodiment. FIGS. 7A and 7B provide enlarged views illustrating the essential parts of the first and second processes to produce the first protruding end part of the first connector according to the present embodiment. FIGS. 8A-8D provide a cross section view illustrating the first and second processes to produce the first protruding end part of the first connector according to the present Embodiment. In FIGS. 5A and 5B and FIGS. 6A and 6B, FIGS. 5A and 6A are a top view, while FIGS. 5B and 6B are a bottom view. In FIGS. 7A and 7B, FIG. 7A is an enlarged view of part E of FIG. 5B, while FIG. 7B is an enlarged view of part F of FIG. 6B. In FIGS. 8A-8D, FIG. 8A is a cross section view taken along the line A-A of FIG. 5A, FIG. 8B is a cross section view taken along the line B-B of FIG. 5A, FIG. 8C is a cross section view taken along the line C-C of FIG. 6A, and FIG. 8D is a cross section view taken along the line D-D of FIG. 6A.

The first terminal 61 is a metal plate bent in the plate thickness direction and is made by processing, such as punching and bending, a metal plate. As illustrated in FIG. 4, the first terminals 61 are provided connected to a flat board-shaped terminal carrier 68 as a carrier. Such a member illustrated in FIG. 2 is obtained by connecting the front ends of the tail parts 62 of the first terminals 61 to the terminal carrier 68 through corresponding long connection arms 68*a*, then cutting off the tail parts 62 from the connection arms 68*a* at the cut parts 68*b*.

In the process of integrating the first terminals 61 with the first housing 11 by insert molding, the first terminals 61 are provided connected to the carrier 68, as illustrated in FIG. 4. FIG. 4 illustrates an example to produce the left half body part 10A. In this example, the first terminals 61 having the tail parts 62 outwardly (the Y-axis positive direction) projecting are connected to the terminal carrier 68 illustrated on the right in FIG. 4, while the first terminals 61 having the tail parts 62 inwardly (the Y-axis negative direction) projecting are connected to the terminal carrier 68 on the left in FIG. 4. In this state, the first terminals 61 are set in the mold (not illustrated) for the first molding. By holding and operating the terminal carriers 68 in connection with a plurality of first terminals 61, the first terminals 61 can be simultaneously positioned and set in the mold for molding.

Subsequently, melted insulating material, such as synthetic resin, is injected into the cavity of the mold for molding. The first insert molding is started in this manner. Any kind of material may be used as the insulating material. In this example, liquid crystal polymer (LCP) is used. A material excellent in flowability is preferably selected for the first insert molding. When the injected insulating material is cooled and solidified so as to form the first housing 11, the mold for molding is opened and the left half body part 10A having the first terminals 61 in connection with the terminal carriers 68, as illustrated in FIG. 4 is removed therefrom. The right half body part 10B having the first terminals 61 in connection with the terminal carriers 68 is produced in the same manner.

Subsequently, of the terminal carriers 68 in connection with the first terminals 61 of the left half body part 10A, as illustrated in FIG. 4, the terminal carrier 68 (the terminal carrier 68 on the left in FIG. 4) in connection with the tail parts 62 that are inwardly projecting is separated from the left half body part 10A, while the terminal carrier 68 in connection with the tail parts 62 (the terminal carrier 68 on the right in FIG. 4) that are outwardly projecting is left connected. Likewise, the terminal carrier 68 in connection with the first terminals 61 of the right half body part 10B is separated from the terminal carrier 68 in connection with the tail parts 62 that are inwardly projecting, while the terminal carrier 68 in connection with the tail parts 62 that are outwardly projecting is left connected.

Subsequently, as illustrated in FIGS. 5A and 5B, the left half body part 10A and the right half body part 10B having only the outwardly projecting tail parts 62 in connection with the terminal carriers 68 are set opposite to each other in a mold (not illustrated) for second molding. More specifically, the right and left half body parts 10 are set such that the insides thereof face each other, the first housings 11 are in parallel with each other, the mounting surfaces 17*a* along with the end surfaces 15*e* located at both ends in the longitudinal direction of the first housings 11 are flush with each other, and the embedded parts 15 are adjacent to but not in contact with each other. Furthermore, as illustrated in FIG. 7A, the opposing right and left half body parts 10 are positioned such that the parallel inner surfaces 15*c*1 of opposing embedded parts 15 are a predetermined distance L2 away from each other and set in the mold for second molding.

Subsequently, the first reinforcement fitting 51 is set in the mold for second molding so as to cover at least a part of the extension end parts 14 and the entirety of the embedded parts 15 of the right and left half body parts 10. Specifically, the first reinforcement fitting 51 is set with the front end of the tail part 52*a* connected with a fitting carrier 58 as a carrier. The first reinforcement fitting 51 in the shape illustrated in FIG. 2 is obtained by cutting off the tail part 52*a* from the fitting carrier 58 at a cut part 58*b*. More specifically, as illustrated in FIG. 7A and FIGS. 8A and 8B and other drawings, the first reinforcement fitting 51 is set such that gaps are formed between: the top plate 54 and the upper surface 15*a* of the embedded part 15; the leg part 55 and the outer surface 15*b* of the embedded part 15; the end wall outer cover part 52 and the end surface 15*e* of the embedded part 15; and the end wall inner cover part 53 and the inclined inner surface 15*c*2 of the embedded part 15, such that the lower end of the leg part 55 is located below the lower surface 15*d* of the embedded part 15 while located at substantially the same level as the mounting surface 17*a*.

Subsequently, melted insulating material such as synthetic resin is injected into the cavity of the mold for molding. The second insert molding is started in this manner. The insulating material may be any kind of material. In this example, as with the first insert molding, LCP is used taking flowability into consideration. The insulating material used for the second insert molding may be selected based on the strength and melt bondability with the insulating material of the first insert molding. When the injected insulating material is cooled and solidified so as to form the cover part 16, the mold for molding is opened. The right and left half body parts 10, in which both ends in the longitudinal direction are joined together by the first protruding end parts 18, as illustrated in FIGS. 6A and 6B, are removed from the mold.

In this structure, the right and left half body parts 10 are integrated with the cover part 16 such that at least part of the extension end parts 14 and the entirety of the embedded parts 15 are covered by the cover part 16. The first reinforcement fitting 51 is integrated with the cover part 16 so as to cover at least part of the outer surface of the cover part 16. More specifically, as illustrated in FIG. 7B and FIGS. 8C and 8D and other drawings, the gaps between the top plate 54, the leg part 55, the end wall outer cover part 52, and the end wall inner cover part 53 of the first reinforcement fitting 51 and the upper surface 15*a*, the outer surface 15*b*, the end surface 15*e*, and the inclined inner surface 15*c*2 of the embedded part 15, respectively, are filled with the insulating material of the cover part 16. Similarly, the gap between the parallel inner surfaces 15*c*1 of the opposing embedded parts 15 is filled with the insulating material of the cover part 16. The portion under the lower surface 15*d* of the embedded part 15 is also filled with the insulating material of the cover part 16, such that the lower surface of the cover part 16 is substantially flush with the mounting surface 17*a*. The parallel outer surface 14*b*2 of the extension end part 14 is substantially flush with the outer surface of the cover part 16 and constitutes part of the outer surface of the first protruding end part 18.

As illustrated in FIG. 7A, a gap is formed between the end wall inner cover part 53 of the first reinforcement fitting 51 and each of the inclined inner surfaces 15*c*2 of the embedded parts 15. Moreover, since the inclined inner surface 15*c*2 is inclined, this structure allows the melted insulating material injected into the cavity of the mold for molding during the second insert molding to flow between the end wall inner cover part 53 and the right and left inclined inner surfaces 15*c*2 in addition to flowing between the parallel inner surfaces 15*c*1 of the embedded parts 15 opposite to each other. The cavity is thereby completely filled with the material. In addition, a large space formed between the end wall inner cover part 53 and the right and left inclined inner surfaces 15*c*2 allows an increase in the amount of injected insulating material.

As illustrated in FIG. 7A, the width L1 representing the dimension in the width direction of the first connector 1 of the end wall inner cover part 53 of the first reinforcement fitting 51 facing the gap between the parallel inner surfaces 15*c*1 of the embedded parts 15 is preferably larger than the distance L2 representing the gap between the parallel inner surfaces 15*c*1. In other words, it is preferable to satisfy L1>L2. The width of the end wall outer cover part 52 is larger than the width of the end wall inner cover part 53. The boundary between the parallel inner surface 15*c*1 of the embedded part 15, formed by the first insert molding, and the cover part 16, formed by the second insert molding, is covered by the end wall outer cover part 52 and the end wall inner cover part 53 when viewed in the front-rear direction (the X-axis direction). This structure prevents easy separation and enhances the strength of the first protruding end part 18.

As illustrated in FIG. 7A, the dimension, or the length L3, of the leg part 55 of the first reinforcement fitting 51 in the longitudinal direction of the first connector 1 is preferably larger than the length L4 of the outer surface 15*b* of the embedded part 15. In other words, it is preferable to satisfy L3>L4. It is further preferable that, of the ends of the outer surface 15*b* in the longitudinal direction of the first connector 1, the end closer to the middle of the first connector 1 be located closer to the end in the longitudinal direction of the first connector 1, relative to the end of the leg part 55 closer to the middle in the longitudinal direction of the first connector 1. This structure allows the boundary between the outer surface 15*b* of the embedded part 15, formed by the first insert molding, and the cover part 16, formed by the second insert molding, to be covered by the leg part 55 when viewed in the width direction (the Y-axis direction). This structure prevents easy separation and enhances the strength of the first protruding end part 18.

Furthermore, the embedded part 15 is disposed so as to at least partially overlap any of the top plate 54, the end wall outer cover part 52, the end wall inner cover part 53, and the leg part 55 of the first reinforcement fitting 51 when viewed in the height direction, the front-rear direction (the longitudinal direction), and the right-left direction (the width direction). This structure enhances the strength of the first protruding end part 18.

In the final step, the remaining terminal carriers 68 and the fitting carriers 58 are cut off from the right and left half body parts 10 having both ends in the longitudinal direction joined together by the first protruding end parts 18, as illustrated in FIGS. 6A and 6B. Consequently, the first connector 1 as illustrated in FIG. 1 is obtained.

The configuration of the second connector 101 constituting a connector pair along with the first connector 1 will now be described, along with the operation to mate the first connector 1 and the second connector 101.

Figure 9:
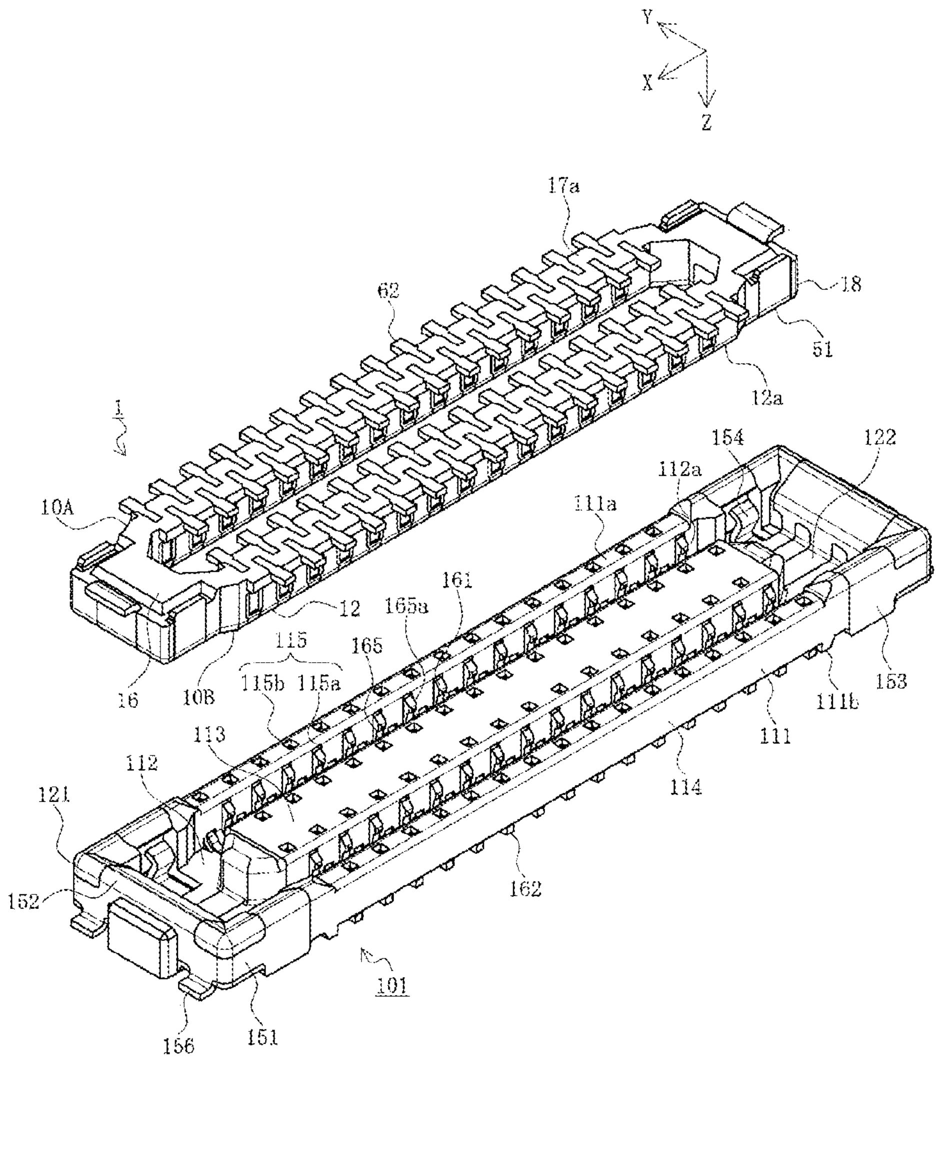
FIG. 9 is a perspective view viewed from the first connector side to illustrate the state immediately prior to mating of the first connector and a second connector according to the present embodiment.

FIG. 9 is a perspective view viewed from the first connector side to illustrate the state immediately prior to mating of the first connector and a second connector according to the present Embodiment.

The second connector 101, as a counterpart connector according to the present embodiment, has a second housing 111 as a counterpart connector main body integrally formed of an insulating material such as synthetic resin. As depicted in the figure, the second housing 111 has a substantially rectangular thick plate-like shape that is a substantially rectangular parallelepiped. Furthermore, the side of the second housing 111 into which the first connector 1 is inserted, in other words, the side of the mating surface 111*a* (Z-axis negative direction), is a substantially rectangular recessed part 112 with an enclosing periphery, forming the recessed part 112 to be mated with the first housing 11. Inside the recessed part 112 is the second protruding part 113, as an insular part to be mated with a recessed groove part 13, that is integrally formed with the second housing 111; moreover, side wall parts 114 extending in parallel with the second protruding part 113 on both sides of the second protruding part 113 are integrally formed with the second housing 111.

The second protruding part 113 and the side wall parts 114 protrude upwardly (Z-axis negative direction) from the bottom surface of the recessed part 112 and extend in the longitudinal direction of the second connector 101. Consequently, a recessed groove part 112*a* that is an elongated recessed part extending in the longitudinal direction (X-axis direction) of the second connector 101 is formed as part of the recessed part 112 on both the sides of the second protruding part 113.

Second terminal stowing groove-shape cavities 115*a* in the shape of a recessed groove are formed on both side surfaces of the second protruding part 113 and on the inner side surfaces of the side wall parts 114 in order to stow the second terminals 161. Second terminal stowing hole-shape cavities 115*b* in the shape of a hole are formed on the second protruding part 113 and on the side wall parts 114 in order to stow the second terminals 161. The second terminal stowing groove cavity 115*a* and the second terminal stowing hole-shape cavity 115*b* are connected and integrated with each other on the bottom surface of the recessed groove part 112*a*. The second terminal stowing groove-shape cavity 115*a* and the second terminal stowing hole-shape cavity 115*b* are therefore described as a second terminal stowing cavity 115 when collectively described. The second terminal stowing cavity 115 is disposed at a pitch corresponding to the first terminals 61 and at the corresponding appropriate number.

The second terminal 161 is a member integrally formed by applying a process such as punching or the like to a conductive metal plate and consists of a main body part, a tail part 162 connected to the bottom end of the main body part, a connecting part that extends in the width direction (Y-axis direction) of the second connector 101 from close to the bottom end of the main body part, and a contact part 165 that extends upwards (Z-axis positive direction) from the connecting part. Note that a contact protruding part 165*a* that protrudes towards the main body part is preferably formed near the tip of the contact part 165.

The main body part is a part that is press-fit and retained in the second terminal stowing hole-shape cavity 115*b*. In addition, the tail part 162 is bent connected to the lower end of the main body part, extends in the width direction of the second housing 111, and is connected by soldering or the like to a connection pad connected with the conductive trace of the second board. The conductive trace is typically a signal line. The contact part 165 contacts the first terminal 61 of the first connector 1 in the event the first connector 1 and the second connector 101 mate. Preferably, the contact protruding part 165*a* engages with the contact recessed part 65*a* formed on the contact part 65 of the first terminal 61.

The second terminal 161 is inserted into the second terminal stowing cavity 115 from the lower part of the second housing 111 and mounted in the second housing 111. In this manner, the main body part of the second terminal 161 is press-fit into the second terminal stowing hole-shape cavity 115*b* and retained, whereas the contact part 165 is stowed in the second terminal stowing groove-shape cavity 115*a* so as to be exposed to the recessed groove part 112*a*. The lower surface of the tail part 162 is exposed to a mounting surface 111*b* serving as the lower surface of the second housing 111.

In addition, similar to the first terminal 61, the second terminals 161 mounted in each of the recessed groove parts 112*a* are oriented such that the posture of those that are adjacent will face opposing directions in regard to the width direction of the recessed groove part 112*a*. In the example illustrated in FIG. 9, of the second terminals 161 mounted in the recessed groove part 112*a* on the side in the Y-axis positive direction, the second terminal 161 positioned at the front end (end in the X-axis positive direction) is oriented such that the tail part 162 protrudes in the Y-axis negative direction, while the second terminal 161 positioned second from the front end is oriented such that the tail part 162 protrudes in the Y-axis positive direction. In this manner, as the second terminals 161 are mounted in the recessed groove part 112*a* arranged in a line in alternating directions, the pitch of the tail parts 162 exposed on the mounting surface 111*b* on both sides of the recessed groove part 112*a* is set to twice the pitch of the second terminals 161. This configuration facilitates the operation of connecting the second terminal 161 to the connection pad of the second board by soldering or the like. In addition, the pitch of the contact part 165 exposed to the recessed groove part 112*a* is set to twice the pitch of the second terminals 161.

In addition, the second protrusion end parts 121 are disposed as mating guide parts on both ends in the longitudinal direction of the second housing 111. The mating recessed parts 122 are formed as part of the recessed part 112 in each second protruding end part 121. The mating recessed parts 122 are substantially rectangular recess parts that are connected to both ends in the longitudinal direction of each recessed groove part 112*a*. Moreover, in a state in which the first connector 1 and the second connector 101 are mated inside the mating recessed part 122, the first protruding end part 18 provided on the first connector 1 is inserted. A second reinforcement fitting 151 as a counterpart reinforcement fitting is attached to the second protrusion end part 121. The second reinforcement fitting 151 is integrated with the second housing 111 by means of insert molding.

The second reinforcement fitting 151 is a member integrally formed by punching, bending, or the like of a metal plate and has a second main body part 152 extending in the width direction of the second housing 111, a lateral cover part 153 connected to both the left and right ends of the second main body part 152, a contact side part 154 disposed on the left and right inner walls of the mating recessed part 122, and a tail part 156 connected to the lower end of the second main body part 152. The tail part 156 extends toward the outside in the longitudinal direction of the second connector 101 and is connected by soldering or the like to the connection pad (not illustrated) exposed on the surface of the second board. Note that, for example, the connection pad is preferably coupled with the conductive trace, which is a power line.

Subsequently, the operation of mating together the first connector 1 and the second connector 101 with the above configuration will be described.

The first connector 1 is mounted on the surface of the first board with the tail parts 62 of the first terminals 61 connected by soldering or the like to a connection pad (not illustrated) connected with a conductive trace of the first board, and with the tail part 52*a* of the first reinforcement fitting 51 connected by soldering or the like to a connection pad connected with a conductive trace of the first board. Note that the conductive trace connected to the connection pad to which the tail part 62 of the first terminal 61 is connected is a signal line, while the conductive trace connected to the connection pad to which the tail part 52*a* of the first reinforcement fitting 51 is connected is a power line.

Similarly, the second connector 101 is mounted on the surface of the second board with the tail parts 162 of the second terminals 161 connected by soldering or the like to a connection pad (not depicted) connected with a conductive trace of the second board, and with the tail part 156 of the second reinforcement fitting 151 connected by soldering or the like to a connection pad connected with a conductive trace of the second board. Note that the conductive trace connected to the connection pad to which the tail part 162 of the second terminal 161 is connected is a signal line, while the conductive trace connected to the connection pad to which the tail part 156 of the second reinforcement fitting 151 is connected is a power line.

First, an operator opposes the mating surface 12*a* of the first protruding part 12 as the mating surface of the first housing 11 of the first connector 1 and the mating surface 111*a* of the second housing 111 of the second connector 101, such that when the position of the first protruding part 12 of the first connector 1 is aligned with the position of the corresponding recessed groove part 112*a* of the second connector 101 and when the position of the first protruding end part 18 of the first connector 1 aligns with the position of the corresponding mating recessed part 122 of the second connector 101, position alignment of the first connector 1 and the second connector 101 is complete.

In this state, when the first connector 1 and/or the second connector 101 are moved in a direction approaching the other side, in other words, in a mating direction, the first protruding part 12 and the first protruding end part 18 of the first connector 1 are inserted into the recessed groove part 112*a* and the mating recessed part 122 of the second connector 101. With this process, mating of the first connector 1 and the second connector 101 is completed. Furthermore, the first terminals 61 and the second terminals 161 are placed in a conductive state.

A modification of the first connector 1 will now be described.

Figure 10:
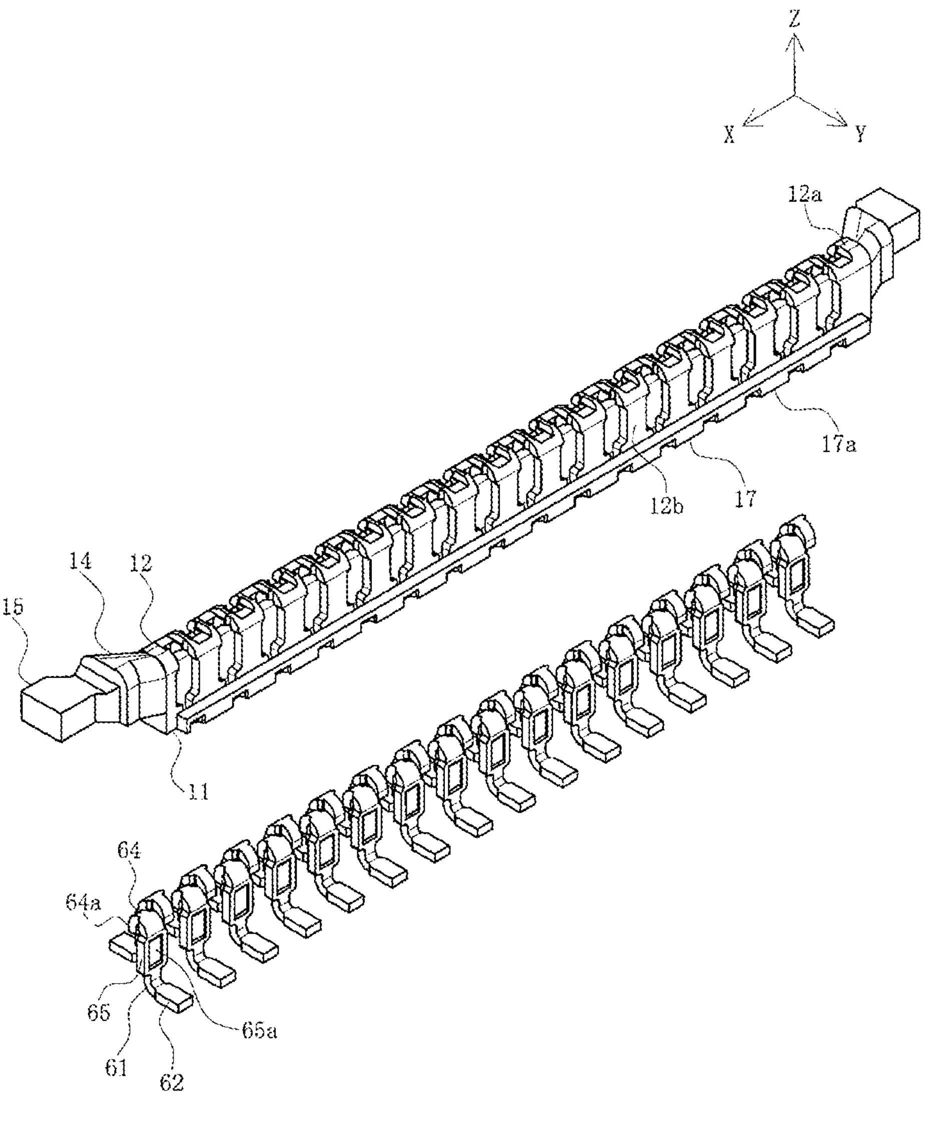
FIG. 10 is an exploded view of the left half body part of the first connector in a modified example according to the present embodiment.
Figure 11:
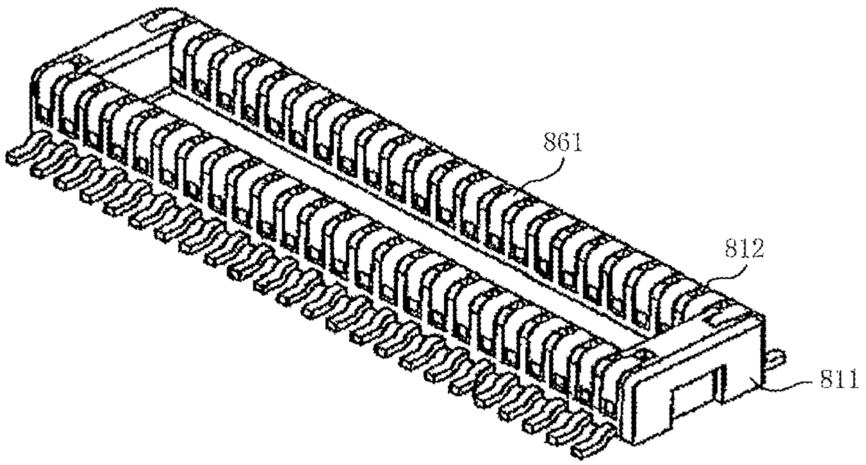
FIG. 11 is a perspective view illustrating a conventional connector.

FIG. 10 is an exploded view of the left half body part of the first connector in a modified example according to the present embodiment.

In the modification illustrated in the drawings, the first terminal 61 includes no main body part 63 but includes a contact part 65 extending in the height direction, a tail part 62 connected to the lower end of the contact part 65 at an angle of approximately 90 degrees, and an upper end part 64 connected to the upper end of the contact part 65 at an angle of approximately 90 degrees. Note that an embedded part 64*a* extending in the downward direction bent at approximately 90 degrees is connected to the tip end of the upper end part 64. The embedded part 64*a* is a part that is embedded in the first protruding part 12 in the downward direction from the mating surface 12*a*.

The tail part 62 of the first terminal 61, illustrated in FIG. 2 and others, extends in the direction opposite the direction in which the contact part 65 faces, whereas the tail part 62 of the first terminal 61 of the modification illustrated in FIG. 10 extends in the same direction as the direction in which the contact part 65 faces. This structure facilitates the operation set of setting the first terminals 61 in the mold for the first molding from the right and left sides, and holding the terminal carrier 68 connected with the front ends of the tail parts 62 through the long connection arms 68*a*, such that the first terminals 61 are oriented in alternately opposing directions.

Since the configuration, operation, and effects of other components of the first terminal 61 in the modification illustrated in FIG. 10 are the same as those of the first terminal 61 illustrated in FIG. 2 and other drawings, a description thereof will be omitted.

In this embodiment, the first connector 1 includes the half body parts 10, each of which includes the first housing 11 and a plurality of first terminals 61 mounted on the first housing 11, the first protruding end part 18 formed on both ends of the first housing 11 with the first housings 11 of the half body parts 10 abutting each other, and the first reinforcement fitting 51 attached to the first protruding end part 18. Each of the first housings 11 is a member integrated with the first terminals 61 by the first insert molding. The first housing 11 includes the first protruding part 12 extending in the longitudinal direction of the first housing 11 and holding the first terminals 61, the extension end part 14 connected to each end in the longitudinal direction of the first protruding part 12, and the embedded part 15 extending from the extension end part 14. The first protruding end part 18 includes the cover part 16 that covers at least part of the extension end part 14 and the entirety of the embedded parts 15 of each of the first housings 11. The cover part 16 is a member integrated with the extension end part 14, the embedded part 15, and the first reinforcement fitting 51 by the second insert molding.

This configuration achieves narrower spacing between the first protruding parts 12 of the first housings 11 to which a plurality of first terminals 61 are mounted, thereby making the first connector 1 more compact. In addition to this, the configuration facilitates the production of the first connector 1 while enhancing the reliability of the first connector 1.

The first reinforcement fitting 51 includes a top plate 54 that extends in the width direction of the first housing 11, a right and left pair of leg parts 55 connected to the right and left edges of the top plate 54 and extending downward, and an end wall outer cover part 52 as well as an end wall inner cover part 53 connected to the front and rear edges of the top plate 54 and extending downward. The embedded part 15 is arranged such that at least a part thereof overlaps the top plate 54, the leg parts 55, the end wall outer cover part 52, and the end wall inner cover part 53 when viewed from the top, bottom, front, rear, right, and left. This structure allows the embedded part 15 of the left half body part 10A and the embedded part 15 of the right half body part 10B to be firmly joined together by the cover part 16 integrated with the first reinforcement fitting 51, thereby achieving the precise formation of the first protruding end part 18 and the tight connection between the left half body part 10A and the right half body part 10B.

The embedded part 15 of the first housing 11 includes the parallel inner surface 15*c*1 extending in the longitudinal direction of the first housing 11 and opposite the embedded part 15 of the other first housing 11. The distance L2 between the opposing parallel inner surfaces 15*c*1 is smaller than the width L1 of the end wall inner cover part 53 of the first reinforcement fitting 51 facing the gap formed between the opposing parallel inner surfaces 15*c*1. With this structure, the boundary between the parallel inner surface 15*c*1 of the embedded part 15 formed by the first insert molding and the cover part 16 formed by the second insert molding overlaps the end wall inner cover part 53 when viewed in the front-rear direction. This prevents easy separation and enhances the strength of the first protruding end part 18.

The end wall inner cover part 53 is opposite the inclined inner surfaces 15*c*2 of the embedded parts 15 that are connected to the respective parallel inner surfaces 15*c*1 opposite each other and are inclined with respect to the longitudinal direction of the first housing 11. In addition, the end wall inner cover part 53 is arranged so as to form a space along with the inclined inner surfaces 15*c*2.

The embedded part 15 of the first housing 11 includes the outer surface 15*b* extending in the longitudinal direction of the first housing 11 and facing the leg part 55 of the first reinforcement fitting 51. The length L4 of the outer surface 15*b* is smaller than the length L3 of the leg part 55. This structure allows the boundary between the outer surface 15*b* of the embedded part 15 formed by the first insert molding and the cover part 16 formed by the second insert molding to be covered by the leg part 55 when viewed in the right-left direction, thereby preventing easy separation and enhancing the strength of the first protruding end part 18.

The extension end parts 14 of the first housing 11 extend from both ends in the longitudinal direction of the first protruding part 12, while being inwardly inclined in the width direction of the first connector 1. The width of the first protruding end part 18 is smaller than the width of the first connector 1. Since the first protruding end part 18 has a smaller width than the width of the first connector 1, in the event the first connector 1 and the second connector 101 mate, this structure enables the first protruding end part 18 to fit in the mating recessed part 122 of the second housing 111, which actually has a small inner width due to the contact side parts 154 formed on the right and left inner walls of the mating recessed part 122.

Note that the disclosure herein describes features relating to suitable exemplary embodiments. Various other embodiments, modifications, and variations within the scope and spirit of the claims appended hereto will naturally be conceived of by those skilled in the art upon review of the disclosure herein. For example, the staggered arrangement of the terminals does not have to be regular. In addition, the arrangement of the terminals on the left and right half body parts do not need to be the same. Furthermore, the left and right half body parts do not need to be axially symmetric.

The present disclosure can be applied to a connector.

The invention claimed is:

1. A connector comprising:

half body parts, each including a connector main body and a plurality of terminals arranged at a predetermined pitch and integrated with the connector main body by insert molding;

a main body end part formed at both ends of the connector main body by coupling connector main bodies of a half body part arranged in parallel, and a reinforcing metal fitting integrated with the main body end part, wherein;

each of the terminals includes a tail part extending outward in a width direction of the connector main body, adjacent terminals of the plurality of terminals held by each connector main body are facing in the opposite direction with respect to the width direction of the connector main body, the pitch of a tail part extending towards each side in the width direction of each connector main body is twice the pitch of the terminals held by each connector main body, and a tail part extending from the connector main body of one half body part towards the connector main body of an adjacent half body part is shifted only by a half pitch with respect to a tail part extending from the connector main body of the adjacent half body part towards the connector main body of the one half body part.

2. The connector according to claim 1, further comprising a through hole opened in an upper surface and a lower surface of the connector, wherein the tail part extending from the connector main body of one half body part toward the connector main body of an adjacent half body part and the tail part extending from the connector main body of the adjacent half body part towards the connector main body of the one half body part are visible through the through hole when viewed from a mating direction.

3. The connector according to claim 1, further comprising a through hole opened in an upper surface and a lower surface of the connector, wherein the tail part extending from the connector main body of one half body part toward the connector main body of an adjacent half body part and the tail part extending from the connector main body of the adjacent half body part towards the connector main body of the one half body part are positioned in the through hole.

4. The connector according to claim 1, wherein an end part of the tail part extending from the connector main body of one half body part towards the connector main body of an adjacent half body part and an end part of the tail part extending from the connector main body of the adjacent half body part towards the connector main body of the one half body part are positioned further towards an outer side in a width direction than a center in the width direction of the connector.

5. The connector according to claim 1, wherein the reinforcing metal fitting includes an upper plate extending in a width direction of the connector main body, a pair of left and right leg parts connected to both left and right side edges of the upper plate and extending downward, and an end wall outer cover part and end wall inner cover part connected to front and rear side edges of the upper plate and extending downward.

6. A connector pair, having the connector according to claim 1 and a counterpart connector that mates with the connector.

* * * * *